United States Patent
Kagami

(10) Patent No.: US 8,018,631 B2
(45) Date of Patent: Sep. 13, 2011

(54) ORIGINAL READING DEVICE AND IMAGE FORMING APPARATUS

(75) Inventor: Yoshinobu Kagami, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 483 days.

(21) Appl. No.: 12/133,102

(22) Filed: Jun. 4, 2008

(65) Prior Publication Data

US 2009/0009828 A1    Jan. 8, 2009

(30) Foreign Application Priority Data

Jul. 4, 2007    (JP) .................................. 2007-176147
Mar. 10, 2008    (JP) .................................. 2008-059284

(51) Int. Cl.
*H04N 1/04*    (2006.01)
*H04N 1/46*    (2006.01)

(52) U.S. Cl. ........ 358/486; 358/463; 358/464; 358/465; 358/496; 358/498; 358/505; 358/474

(58) Field of Classification Search ................. 358/486, 358/463, 464, 465, 496, 498, 474, 505; 382/275
See application file for complete search history.

(56) References Cited

U.S. PATENT DOCUMENTS

| | | | |
|---|---|---|---|
| 5,027,117 A | 6/1991 | Yoshida et al. | |
| 6,839,153 B1 * | 1/2005 | Shimizu | 358/3.21 |
| 2002/0071135 A1 * | 6/2002 | Takeda et al. | 358/1.14 |
| 2005/0105143 A1 | 5/2005 | Kagami | |
| 2005/0254102 A1 | 11/2005 | Kagami | |
| 2006/0061830 A1 * | 3/2006 | Sakakibara | 358/448 |
| 2007/0013954 A1 | 1/2007 | Soeda et al. | |
| 2007/0170258 A1 | 7/2007 | Kagami | |
| 2009/0122361 A1 * | 5/2009 | Oteki | 358/474 |

FOREIGN PATENT DOCUMENTS

| | | |
|---|---|---|
| JP | 3667238 | 4/2005 |
| JP | 2006-229719 | 8/2006 |

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

A line image sensor reads an image of a reading position on a contact glass by a plurality of lines in a main-scanning direction. A replacing unit replaces, when there is a pixel whose read values of read data from a plurality of read lines in a same main scanning period are smaller than a predetermined black threshold and an adjacent pixel whose two arbitrary read values have a difference larger than a predetermined threshold near the pixel, and if the pixel remains at a same pixel position in a predetermined number of continuous main scanning periods, replaces read data of the adjacent pixel and a predetermined number of subsequent pixels with white pixel data.

10 Claims, 15 Drawing Sheets

FIG. 8

| COLOR NUMBER | READ DATA | | | COLOR |
|---|---|---|---|---|
| | R | G | B | |
| 0 | 255 | 255 | 255 | WHITE |
| 1 | 0 | 0 | 0 | BLACK |
| 2 | 128 | 128 | 128 | GRAY |
| 3 | 192 | 0 | 192 | DARK MAGENTA |
| 4 | 255 | 168 | 25 | ORANGE |
| 5 | 230 | 0 | 0 | RED |
| 6 | 0 | 0 | 85 | DARK BLUE |
| 7 | 0 | 64 | 255 | LIGHT BLUE |
| 8 | 100 | 255 | 255 | LIGHT CYAN |

ORIGINAL READING DEVICE AND IMAGE FORMING APPARATUS

CROSS-REFERENCE TO RELATED APPLICATIONS

The present application claims priority to and incorporates by reference the entire contents of Japanese priority documents 2007-176147 filed in Japan on Jul. 4, 2007 and 2008-059284 filed in Japan on Mar. 10, 2008.

BACKGROUND OF THE INVENTION

1. Field of the Invention

The present invention relates to an original reading device that feeds an original in a sub-scanning direction on a contact glass and has a line image sensor that reads a plurality of lines of an image in a main-scanning direction at a reading position on the contact glass, and to an image forming apparatus having the original reading device.

2. Description of the Related Art

In a conventional image reading device of a sheet-scanning type (or a sheet-through type) that feeds an original in a sub-scanning direction on a contact glass and has a line image sensor that reads a single line or a plurality of lines of an image in a main-scanning direction at a reading position on the contact glass, an image of dust, if attached to the contact glass, is read, and a vertical black line image appears on a read image when the dust is not removed.

When such a vertical black line image appears on a read image, a user has to clean the contact glass and have the image reading device to read the image again.

In a technique disclosed in Japanese Patent Application Laid-Open No. 2006-229719, which is made to cope with the problem, dust is detected on a reading surface in a sheet-through reading (automatic document feeding, skimming), by determining whether a line extending in a sub-scanning direction which remains in its position in a main scanning pixel or in its data size is present. Determination is possible because any line on an original, no matter how straight the line is, changes its position in a main scanning pixel or its data size due to skew caused at the time of feeding the original.

In this conventional example, dust on a reading surface is detected when it is determined that a line extending in a sub-scanning direction which remains in its position in a main scanning pixel or in its data size is present.

This detection method requires detection over a number of lines in a sub-scanning direction. Therefore, the larger memory capacity for storing therein read image data necessary for the detection is needed, and the cost of the apparatus increases.

SUMMARY OF THE INVENTION

It is an object of the present invention to at least partially solve the problems in the conventional technology.

According to an aspect of the present invention, there is provided an original reading device that reads an original by feeding it in a sub-scanning direction on a contact glass. The original reading device includes a line image sensor that reads an image of a reading position on the contact glass by a plurality of lines in a main-scanning direction; and a replacing unit that replaces, when there is a first pixel whose read values of read data output from a plurality of read lines at a same main scanning period are smaller than a predetermined black threshold and an adjacent pixel whose two arbitrary read values have a difference larger than a predetermined threshold near the first pixel, and if the first pixel remains at a same pixel position for a predetermined number of continuous main scanning periods, replaces read data of the adjacent pixel and a predetermined number of pixels following the adjacent pixel with white pixel data.

Furthermore, according to another aspect of the present invention, there is provided an original reading device that reads an original by feeding it in a sub-scanning direction on a contact glass. The original reading device includes a line image sensor that reads an image of a reading position on the contact glass by a plurality of lines in a main-scanning direction; and a replacing unit that replaces, when there is a first pixel is present whose read values of read data output from a plurality of read lines at a same main scanning period are all smaller than a predetermined black threshold and an adjacent pixel whose two arbitrary read values have a difference larger than a predetermined threshold near the first pixel, if the first pixel remains at a same pixel position for a predetermined number of a continuous main scanning periods, and if the first pixel is detected a plurality of times, replaces read data of a pixel sandwiched by first pixels and located in a region including the adjacent pixel with white pixel data.

Moreover, according to still another aspect of the present invention, there is provided an original reading device that reads an original by feeding it in a sub-scanning direction on a contact glass. The original reading device includes a line image sensor that reads an image of a reading position on the contact glass by a plurality of lines in a main-scanning direction; a dust detecting unit that detects a dust when a plurality of data output from the line image sensor is all larger than a predetermined threshold; and an output value rewriting unit that rewrites the data output from the line image sensor into a value corresponding to a white pixel value for a pixel in which the dust detecting unit has detected a dust.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic diagram for explaining a relationship between read data and colors (read value);

DETAILED DESCRIPTION OF THE PREFERRED EMBODIMENTS

Exemplary embodiments of the present invention will be described in detail with reference to the accompanying drawings.

Figure 1:
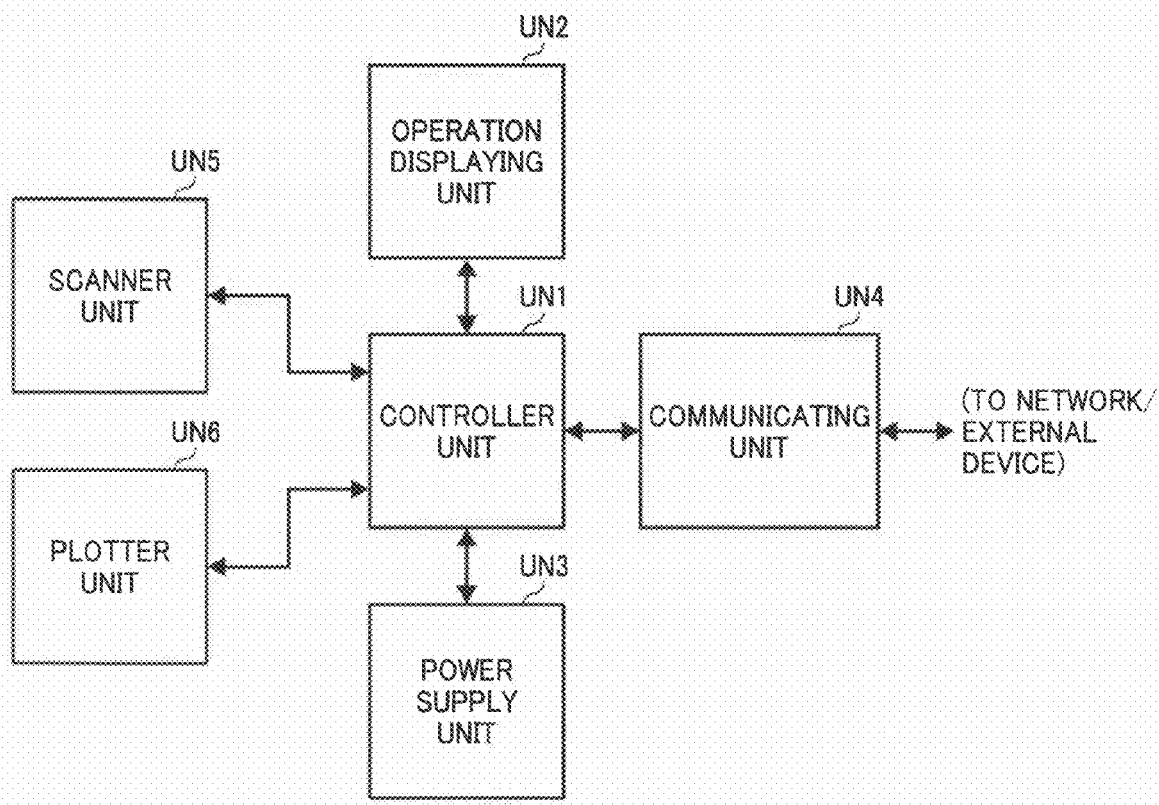
FIG. 1 is a block diagram of an example of an image forming apparatus according to an embodiment of the present invention.

FIG. 1 is a block diagram of an example of an image forming apparatus according to an embodiment of the present invention.

The image forming apparatus includes a controller unit UN 1 that controls the operation of each unit constituting the image forming apparatus; an operation displaying unit UN2 that constitutes a user interface for a user to operate the image forming apparatus; a power supply unit UN3 that supplies power to each unit of the image forming apparatus; a communicating unit UN4 that is connected to an external device or a network to communicate various information with the external device, and to communicate various information with another terminal device, for example, through the network; a scanner unit UN5 that reads original images and forms image data; and a plotter unit UN6 that records copy images, print images, and the like onto recording sheets.

Among the units constituting the image forming apparatus, the scanner unit UN5 and the plotter unit UN6 can be detached from the apparatus. A plurality of types of suitable units can be selected as appropriate to be connected to the apparatus as long as these units conform to a predetermined interface protocol (for example, one defining physical requirements or signal input/output requirements). For example, the scanner unit UN5 may have an automatic document feeder (ADF), or have a monochrome reading function or a color reading function. The plotter unit UN6 may have a post-processing function (sorting function, stapling function, folding function, or the like) to recording paper, or have a monochrome print function or a color print function.

Similarly, the communicating unit UN4 may be selected from plural types of units to be connected to the image forming apparatus depending on the structure of the apparatus. For example, a user can choose and connect either of the communicating unit UN4 with two interfaces (I/F): a host I/F for connecting to a host apparatus such as a personal computer; and a network I/F for connecting to a network, or the communicating unit UN4 with a host I/F alone. Depending on the structure of the image forming apparatus, the communicating unit UN4 may not be connected (in the case of a stand-alone structure, such as a copier).

For example, when both the scanner unit UN5 and the plotter unit UN6 are connected, the image forming apparatus may have a copier function, a printer function, a network printer function, a network facsimile function, a network scanning function, or the like. Depending on the functions of the image forming apparatus, the communicating unit UN4 having an appropriate function is connected.

When only the plotter unit UN6 is connected, the image forming apparatus has a printer function and a network printer function. Depending on the function of the image forming apparatus, the communicating unit UN4 having an appropriate function is connected.

Figure 2:
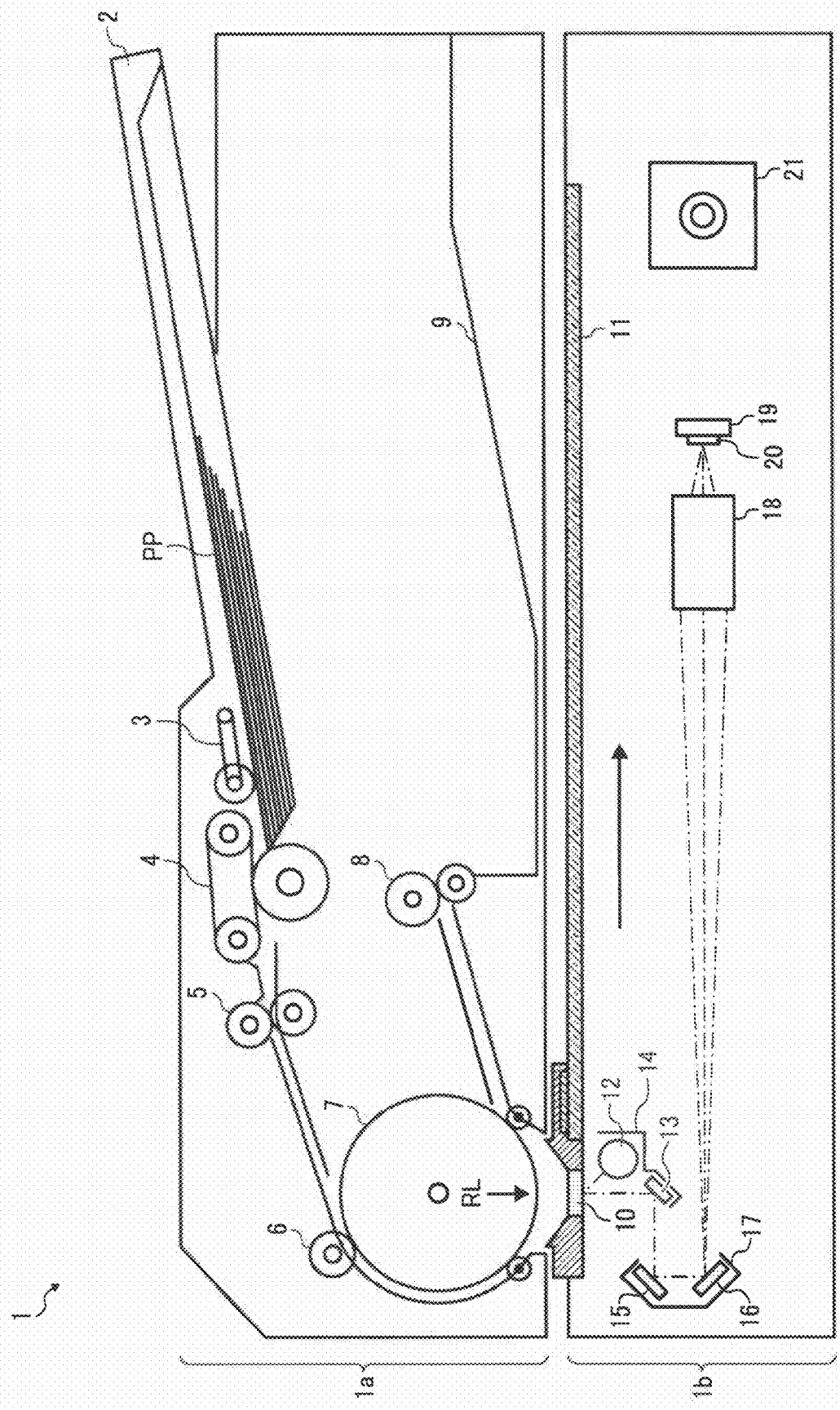
FIG. 2 is a schematic diagram of an image reading device (corresponding to a scanner unit shown in FIG. 1) according to the embodiment.

FIG. 2 is a schematic diagram of a structure of an image reading device 1 (corresponding to the scanner unit UN5 shown in FIG. 1) according to an embodiment of the present invention. The image reading device 1 has an automatic feeding unit 1a that separates each sheet of originals on a platen 2 to feed the sheet to a reading position RL; and an image reading unit 1b that reads an original image at a reading position line by line. The image reading unit 1b has a sheet-scanning original reading function, and a book-scanning original reading function. The present invention primarily relates to a sheet-scanning original reading function. Therefore, the following description does not cover a book-scanning original reading function. The automatic feeding unit 1a is openable and closable to the image reading unit 1b, and can cope with jam of originals. With the book-scanning function, the automatic feeding unit 1a plays a role of a pressing plate that presses the back surface of originals.

In the automatic feeding unit 1a, among originals PP mounted on the platen 2, the uppermost one is taken out by a pickup roller 3, and fed to a separating unit 4 that separates the original into sheets and carries the sheets to a transfer roller 5 sheet by sheet. The transfer roller 5 carries a sheet of the original through a guide member GG in a feed direction.

Thereby, the original PP is nipped between a carrier roller 6 and a conveying drum 7, and carried to a paper discharge roller 8 through a reading position RL while being in contact with the surface of the conveying drum 7. Then, the paper discharge roller 8 discharges the original PP to a paper discharge tray 9.

A contact glass 10 for sheet-scanning is disposed in the image reading unit 1b, corresponding to the reading position RL. The length of the contact glass 10 in the sub-scanning direction is approximately 4 millimeters.

On the right of the contact glass 10 is disposed a contact glass 11 for book scanning. A white reference plate WW is provided for constituting a white reference image for shading correction.

A lamp 12 is for illuminating an original surface of the original PP at the reading position RL. The reflected light from the reading position RL is reflected by a first mirror 13, a second mirror 15, and a third mirror 16 in this order, then, reaches a lens 18. The lens 18 focuses the reflected light to irradiate a color CCD line image sensor 20 provided on a substrate 19 with the light.

The lamp 12 and the first mirror 13 are mounted on a first carriage 14 and are reciprocated in a sub-scanning direction SS. The second mirror 15 and the third mirror 16 are mounted on a second carriage 17, and are reciprocated in the sub-scanning direction SS. The second carriage 17 is moved at a speed half that of the first carriage 14 to maintain the optical path length from the contact glass 10 to the color CCD line image sensor 20.

A scanner motor 21 drives the first carriage 14 and the second carriage 17.

Figure 3:
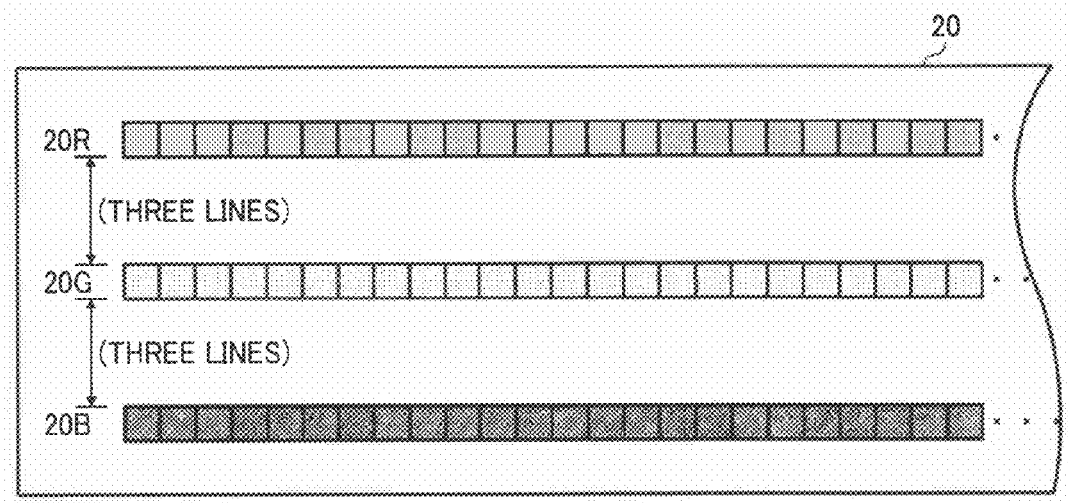
FIG. 3 is a schematic diagram of an example of a color CCD line image sensor.

In the present embodiment, the color CCD line image sensor 20 has a red CCD line image sensor 20R that reads red color component of an image, a green CCD line image sensor 20G that reads green color component of the image, and a blue CCD line image sensor 20B that reads blue color component of the image, as shown in FIG. 3. The sensors are provided at a predetermined interval in the sub-scanning direction (3 lines in this case). If the reading position of each CCD line image sensor is the reference point, the sensors are disposed at an interval of four lines in the sub-scanning direction.

At the time of image reading, the original PP is fed in from the side of the blue CCD line image sensor 20B, so the image of the original PP is first read by the blue CCD line image sensor 20B, then by the green CCD line image sensor 20G, and finally by the red CCD line image sensor 20R.

The coordinate (line number) of the main scanning line read by the red CCD line image sensor 20R in the sub-scanning direction is four lines ahead of the main scanning line being read by the green CCD line image sensor 20G and eight lines ahead of the main scanning line being read by the blue CCD line image sensor 20B.

Therefore, when synthesizing the red image data output by the red CCD line image sensor 20R, the green image data output by the green CCD line image sensor 20G, and the blue image data output by the blue CCD line image sensor 20B to form color image data, the difference in the coordinates of the main scanning line in the sub-scanning direction has to be taken into consideration.

In this case, the green image data passes through a data buffer delaying by four lines of the main scanning lines, and the blue image data through another data buffer delaying by eight lines of the main scanning lines. Thereby, data of the same main scanning line as the red image data can be obtained. By synthesizing the delayed green image data, blue image data, and the red image data at the same pixel position (coordinate in the main-scanning direction), the color read image data can be obtained. This processing for resolving the inter-line delays is called "inter-line correction."

Figure 4:
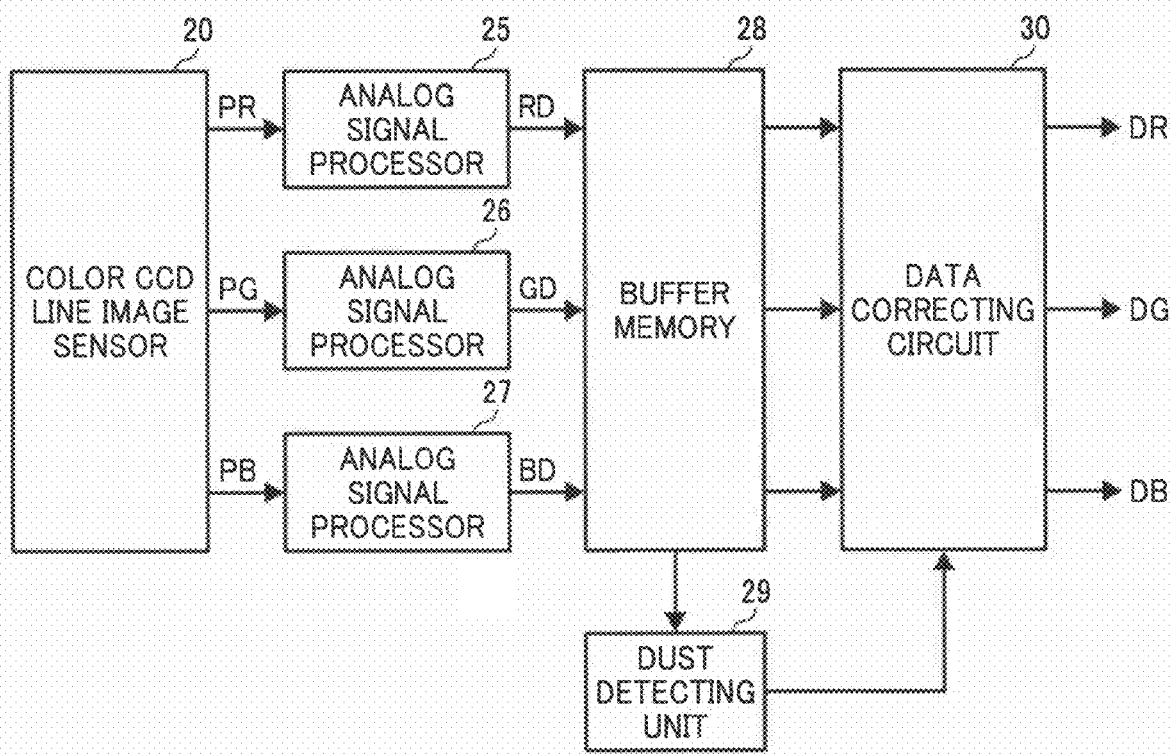
FIG. 4 is a block diagram of an example of a system of processing a reading signal by the image reading device according to the embodiment.

FIG. 4 is a block diagram of a system of processing a reading signal by the image reading device 1 according to an embodiment of the present invention.

In FIG. 4, a red reading signal PR, a green reading signal PG, and a blue reading signal PB output from the color CCD line image sensor 20 are subject to a predetermined image signal processing and an analog-digital conversion by analog signal processors (analog front end (AFE)) 25, 26, and 27, respectively.

Red read data RD, green read data GD, and blue read data BD of a predetermined number of lines, output from the analog signal processors 25, 26, and 27, respectively, are stored in a buffer memory 28.

A dust detecting unit 29 detects image data in which several pixels peripheral to a black vertical line are colored and read data shows little change in the sub-scanning direction, based on the red read data RD, the green read data GD, and the blue read data BD stored in the buffer memory 28.

When the dust detecting unit 29 detects such image data, a data correcting circuit 30 deletes the image data of the portion including the black vertical line and the peripheral several colored pixels (described later). The capacity of the buffer memory 28 requires only several lines to several tens of lines that the dust detecting unit 29 needs for determination.

In a conventional example, an image is detected in which read data of the main scanning remains unchanged in the sub-scanning direction. On the contrary, the colored pixels peripheral to a black vertical line is detected in the present embodiment; therefore, the far smaller number of lines than in the conventional example suffices.

This is one of the most advantageous effects of the present invention. In other words, read data for several lines to several tens of lines are successively detected and data detected as dust can be removed simultaneously.

A method of detecting dust on the contact glass 10 will now be explained.

Figure 5:
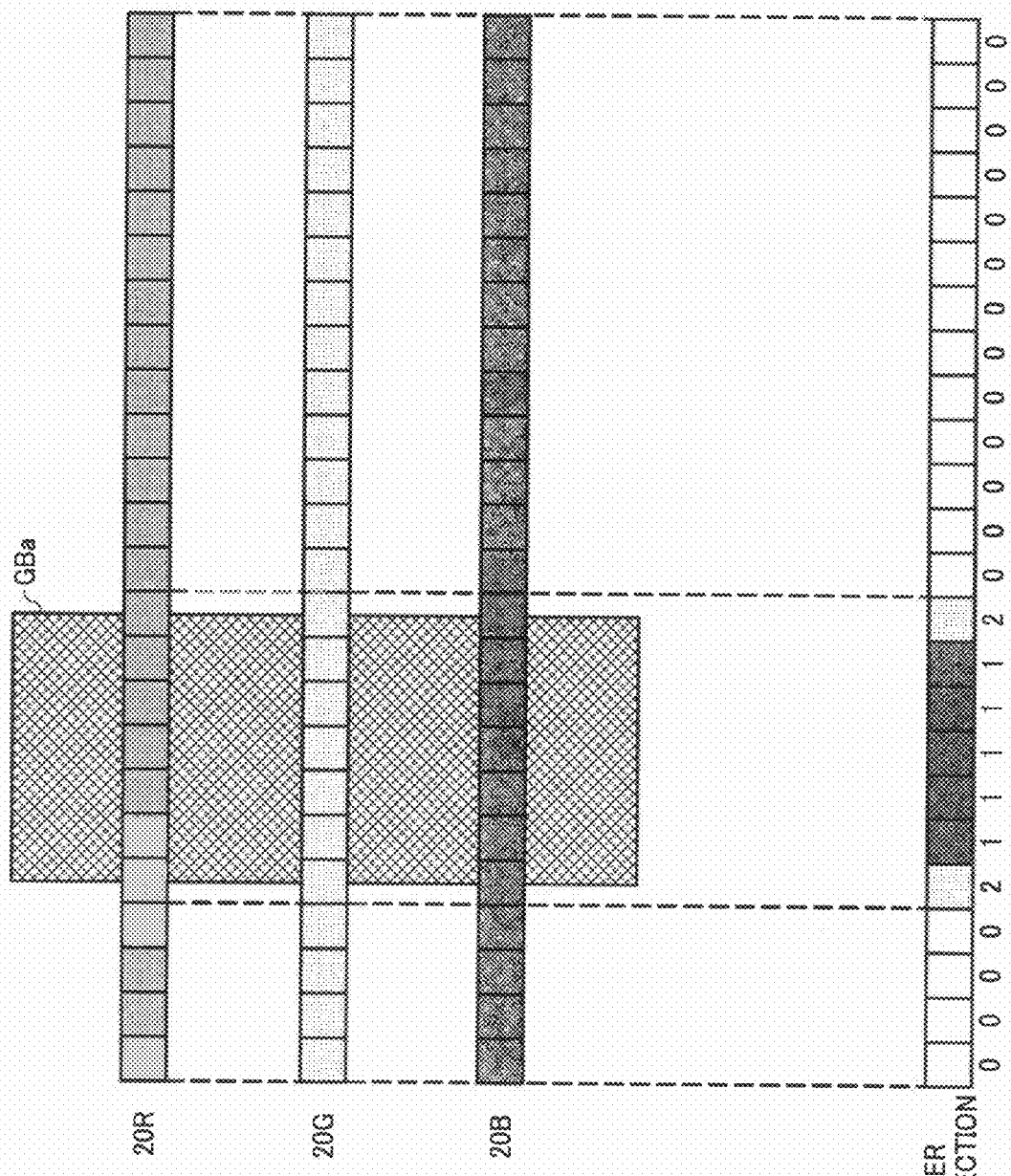
FIG. 5 is a schematic diagram for explaining an example of dust detection.
Figure 6:
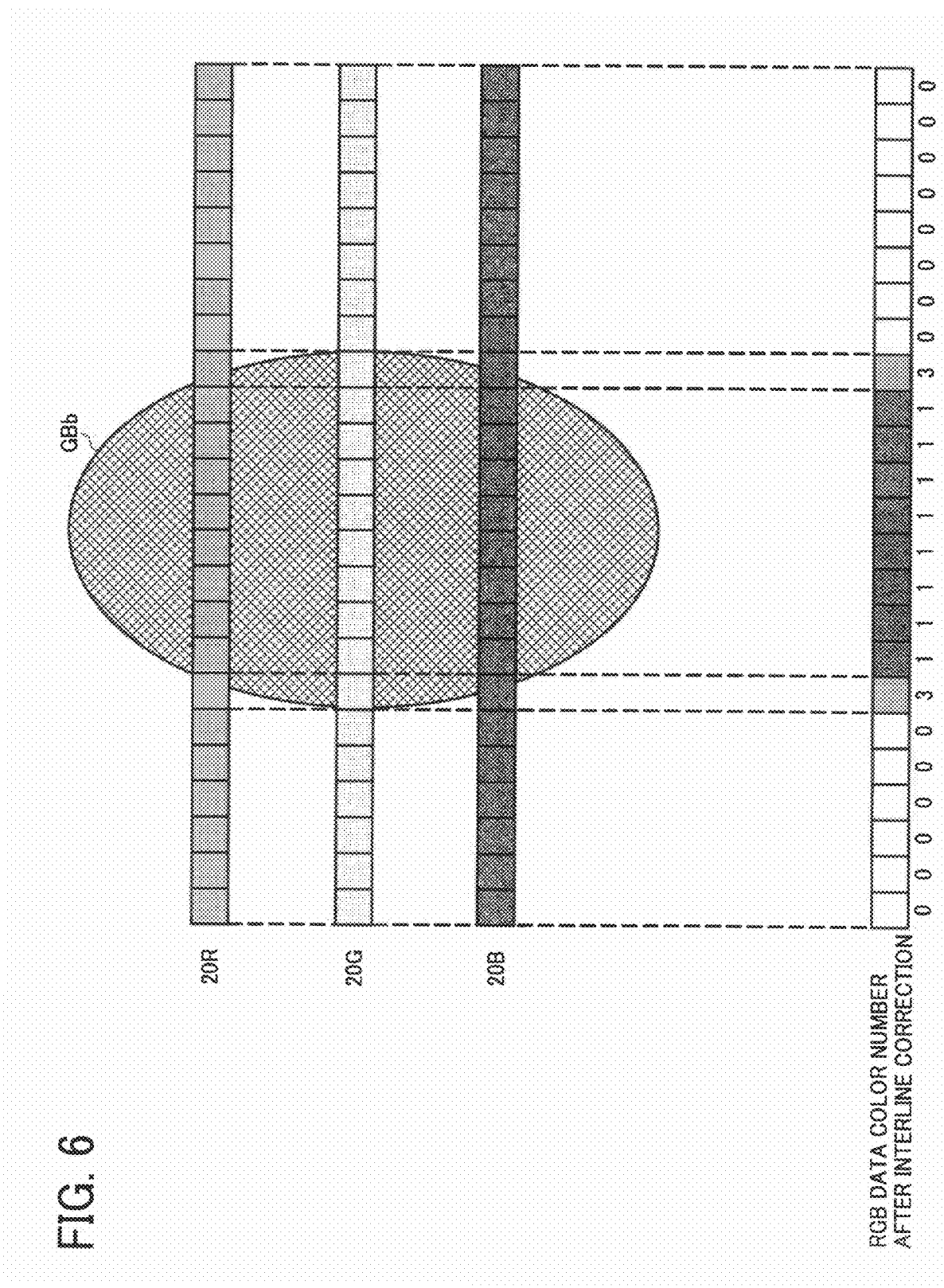
FIG. 6 is a schematic diagram for explaining another example of dust detection.
Figure 7:
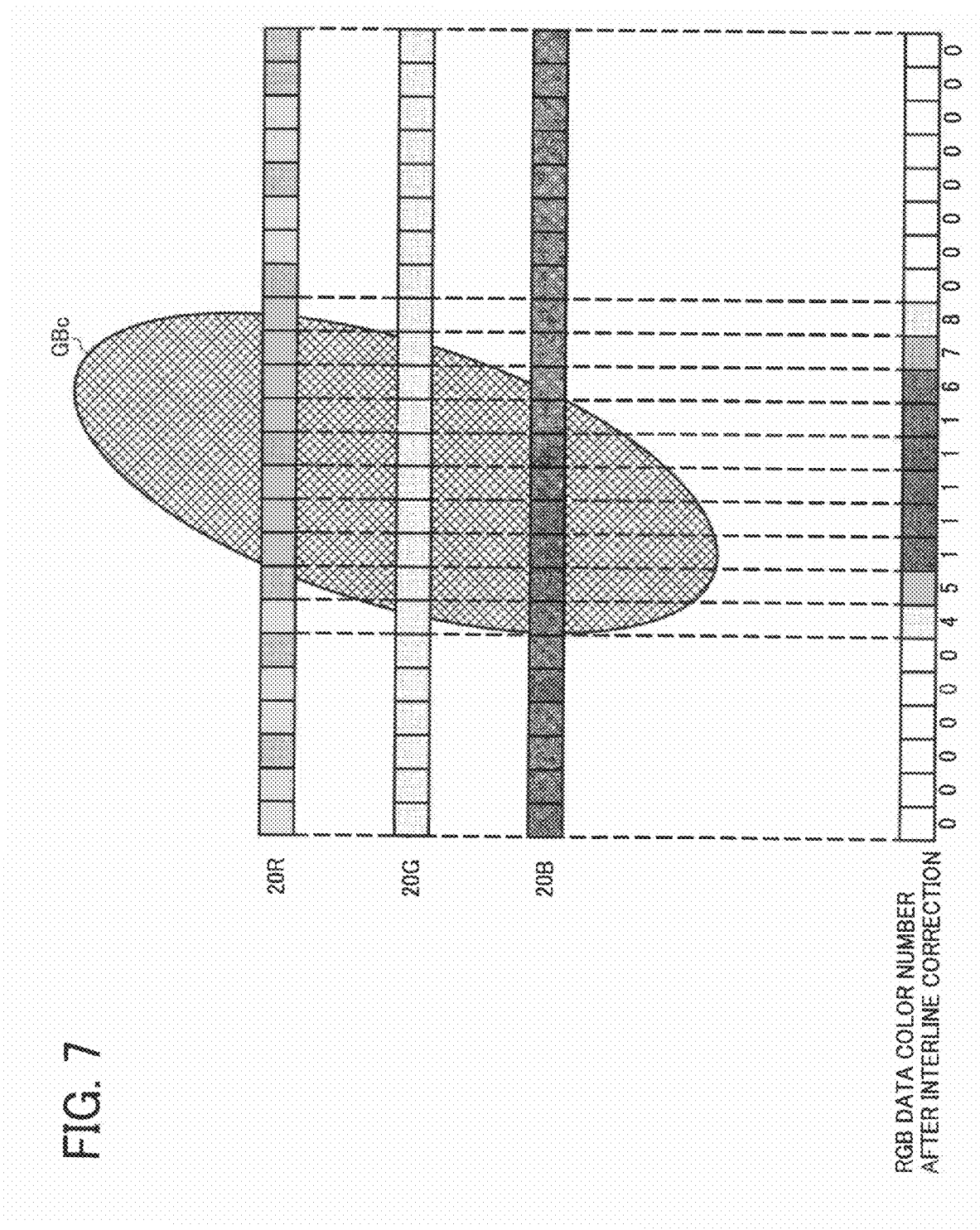
FIG. 7 is a schematic diagram for explaining still another example of dust detection.

FIGS. 5, 6, and 7 are schematic diagrams of relationship between R, G, and B pixel read data (red read data RD, green read data GD, and blue read data BD) and dust GBa, GBb, and GBc having different shapes formed on the color CCD line image sensor 20.

In the present embodiment, dust detection is performed based on this read data. Read data referred to at this time is the red read data RD, the green read data GD, and the blue read data BD obtained at the same main scanning timing. That is, the red read data RD, the green read data GD, and the blue read data BD thus obtained are located at different vertical read positions.

As can be seen in FIG. 5, because the dust GBa has a shape parallel to the sub-scanning direction, which is equal to any straight line parallel to the sub-scanning direction, the GBa cannot be detected as dust by the dust detection method according to the present embodiment.

However, as described in Japanese Patent Application Laid-Open No. 2006-229719, a line parallel to the sub-scanning direction rarely appears on an actual read image due to a skew or the like of the original PP at the time of feeding. Therefore, a practical problem does not occur even if the dust GBa of such a shape cannot be detected.

Referring now to FIG. 6, the dust GBb having a substantial oval shape with its long axis parallel to the sub-scanning direction is examined. At pixels corresponding to both ends of the dust GBb, one fourth of a reading window (aperture) of the red CCD line image sensor 20R and the same amount of a reading window of the blue CCD line image sensor 20B correspond to the GBb, while an entire reading window of the green CCD line image sensor 20G corresponds to the dust GBb.

Accordingly, the red read data RD and the blue read data BD represent "192" in 8-bit digital value, and the green read data GD represents "0" in 8-bit digital value. The color name of the read value represents "dark magenta" (see color number "3" in FIG. 8).

In other words, at pixels at both ends of the dust GBb, the read value representing colors other than black (value obtained by synthesizing the red read data RD, the green read data GD, and the blue read data BD) is obtained. The specific value of the red read data RD, the green read data GD, and the blue read data GD in the explanation of the dust GBb ("192" in the above explanation) is merely one example, and may be another value appropriately.

Assuming that the dust GBb does not move, the same read value is repeatedly generated at the same pixel position in different main scanning lines.

When the same read value is repeatedly generated at the same pixel position in a plurality of main scanning lines, the pixel position with the read value is estimated to correspond to the pixel of both ends of the dust GBb.

The data correcting circuit 30 converts the red read data RD, the green read data GD, and the blue read data BD of the portion including the pixel position and sandwiched between two pixels into "255" representing white in 8-bit digital value, thereby removing the dust component from the read image.

With reference to FIG. 7, the dust GBc having a shape with its long axis inclined to the sub-scanning direction is examined. In this case, the left side of the dust GBc strides over two pixels and the right side strides over three pixels.

Accordingly, a read value representing an intermediate color neither white nor black is obtained at a pixel position that the left and right sides of the dust GBc stride over. At a pixel position that a central part of the dust GBc overlaps, a read value representing black is obtained.

Assuming again that the dust GBc does not move, the same read value is repeatedly generated at the same pixel position in different main scanning lines.

In other words, when the same read value is repeatedly generated at the same pixel position in a plurality of main scanning lines, the pixel position with the read value is estimated to correspond to the pixel of both ends of the dust GBc.

The data correcting circuit 30 converts the red read data RD, the green read data GD, and the blue read data BD of the portion including the position with the read value of an intermediate color and sandwiched between the pixels into "255" representing white in 8-bit digital value, thereby removing the dust component from the read image.

That is, because the dust has an atypical form having an area larger than the pixels of the color CCD line image sensor 20, the dust can be detected by the method described above.

Figure 9:
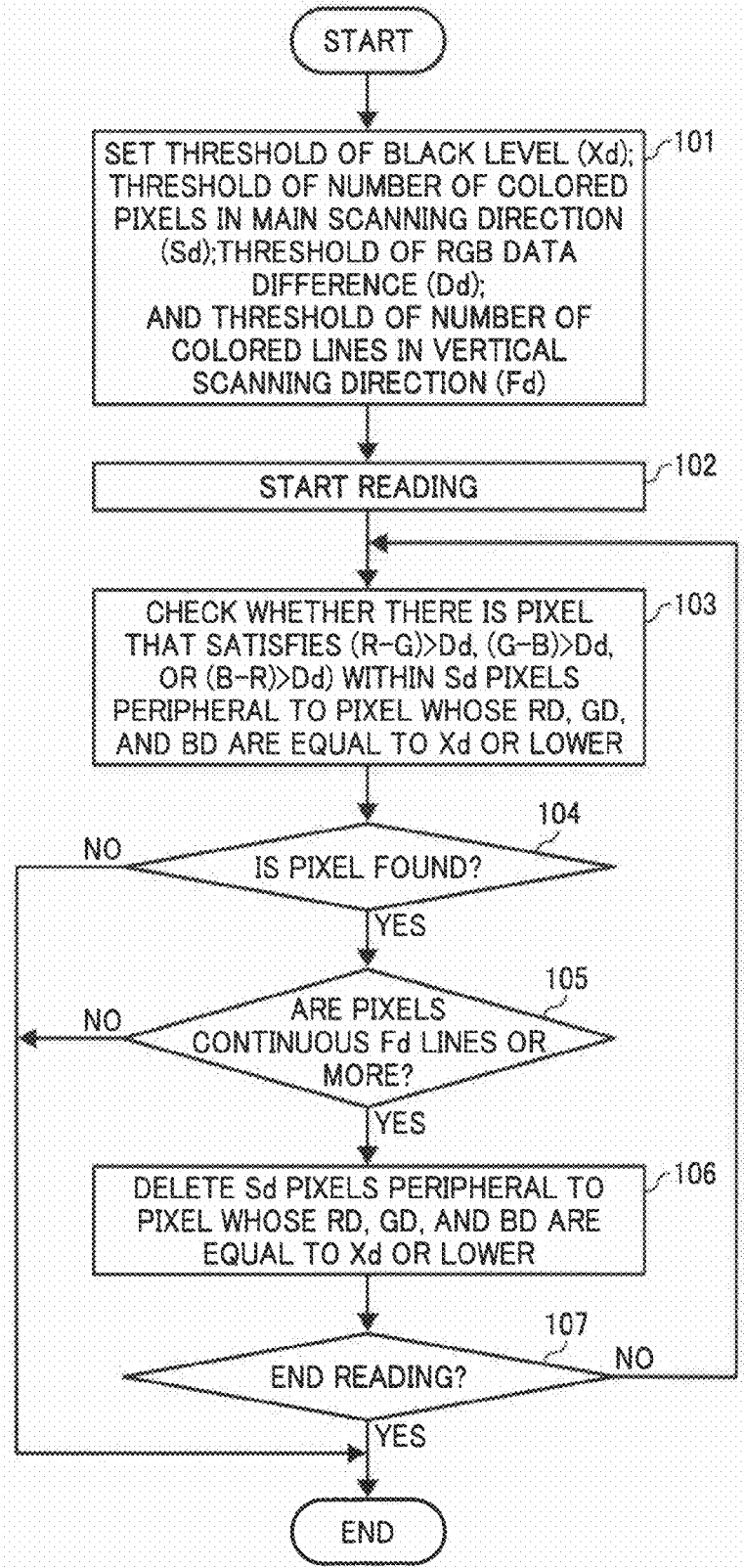
FIG. 9 is a flowchart of a processing procedure for an example of a dust detection method.

FIG. 9 is a flowchart of an example of a dust detection method.

First, a threshold for determining a black level (black level threshold) is set to a constant Xd, a threshold of the number of colored pixels in the main-scanning direction is set to a constant Sd, a threshold of RGB data difference is set to a constant Dd, and a threshold of the number of colored lines in the sub-scanning direction is set to a constant Fd (processing 101).

Then, the reading operation is started (processing 102), and Sd pixels peripheral to a pixel with the read data RD, GD and BD equal to or lower than the threshold Xd is checked whether containing any pixel satisfying any of the following relations: (RD−GD)>Dd; (DG−DB)>Dd; or (DB−DR)>Dd (processing 103).

If a pixel satisfying the relation of a processing 103 is found (YES in the result of determination 104), it is checked whether the pixel satisfying the relation continues to exceed Fd lines (determination 105). When the result of determination 105 is YES, the value of the Sd pixels peripheral to the pixel with the read data RD, GD, and BD equal to or lower than the threshold Xd is changed to 255. Thereby, the pixels are deleted (processing 106).

Processings 103 to 106 are repeated until the end of the reading operation (NO loop of determination 107).

If determination conditions are too stringent, or the constants Xd, Sd, Dd, and Fd (thresholds) are too large, frequency of dust detection lowers. On the contrary, if determination conditions are too lax, the vertical lines of the original are erroneously determined to be dust and deleted.

To cope with this, a service person or a user sets the thresholds appropriate for the type of originals that are frequently used. Thereby, the frequency of erroneous determination can be lowered.

When reading originals at an enlarged or reduced scale, the threshold may be set to a line number (or a pixel number) according to the magnification in the sub-scanning direction (or the main-scanning direction); thereby, the same detection can be performed.

An example for lowering the frequency of erroneous determination has been explained above. When a user selects monochrome reading or when an original reading device or an image forming apparatus has an automatic color select mode, and an original is determined to be monochrome, it is preferable that determination thresholds be made lax so that the frequency of dust detection increases.

The reason for this is because that the original is monochrome, the possibility that colored read data means dust on the reading surface is high.

It is assumed in the example that the dust strides over any line of all of R, G, and B, and determination condition is that "the pixels peripheral to the black vertical lines are colored and the read data shows little change in the sub-scanning direction"; however, the dust may strides over lines of only one or two of R, G, and B in some cases.

In such a case also, only colored portion without a black image may be detected. It should be noted that because the original becomes read data similar to a ruler of a graph sheet or an envelope, the image on the original is easily determined as dust erroneously; therefore, determination condition should be set different from that for the case of a black image (the threshold is set for the direction in which dust is hardly detected).

Figure 10:
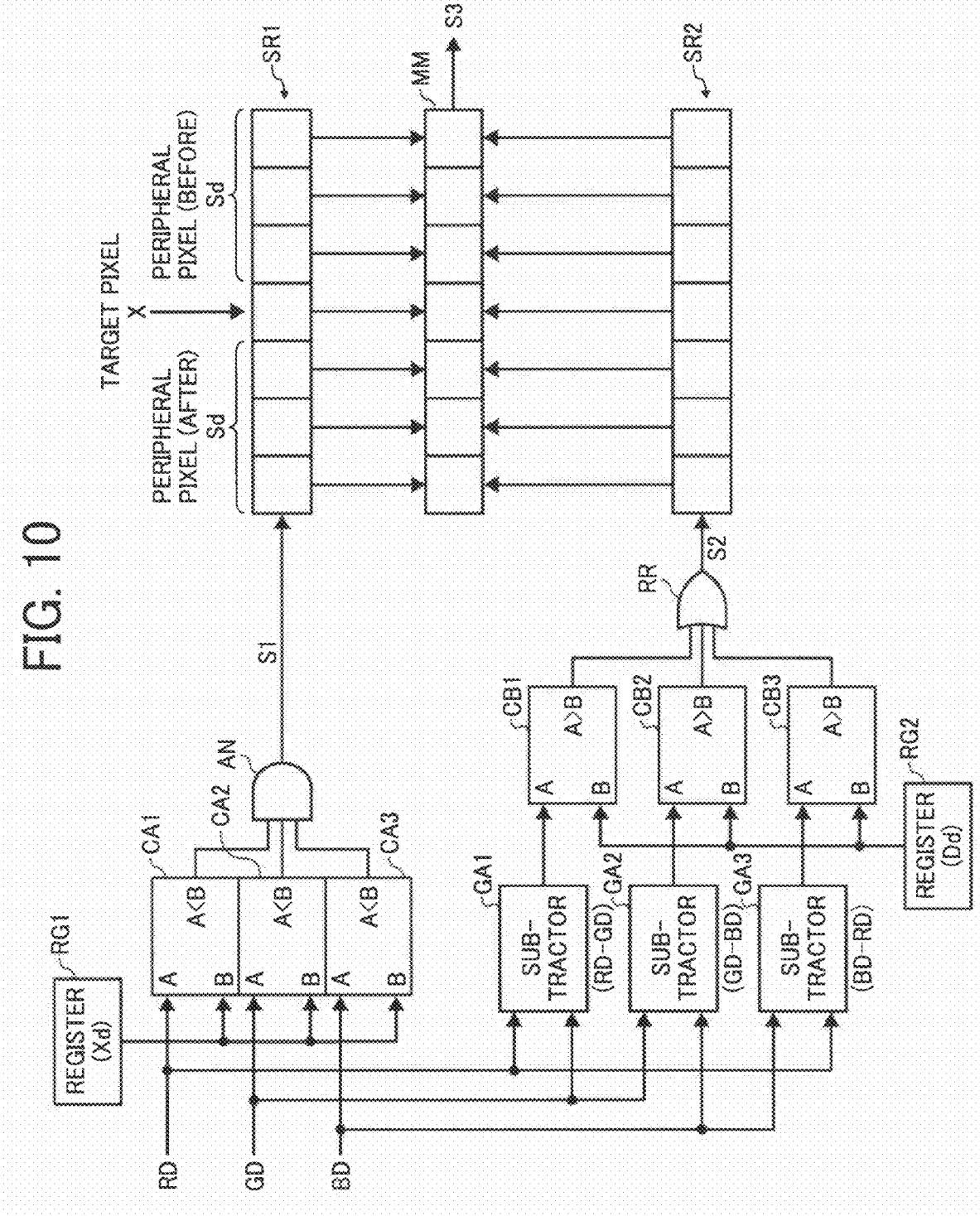
FIGS. 10 and 11 are block diagrams of an example of hardware structure to realize dust removal in the flowchart of FIG. 9.
Figure 11:
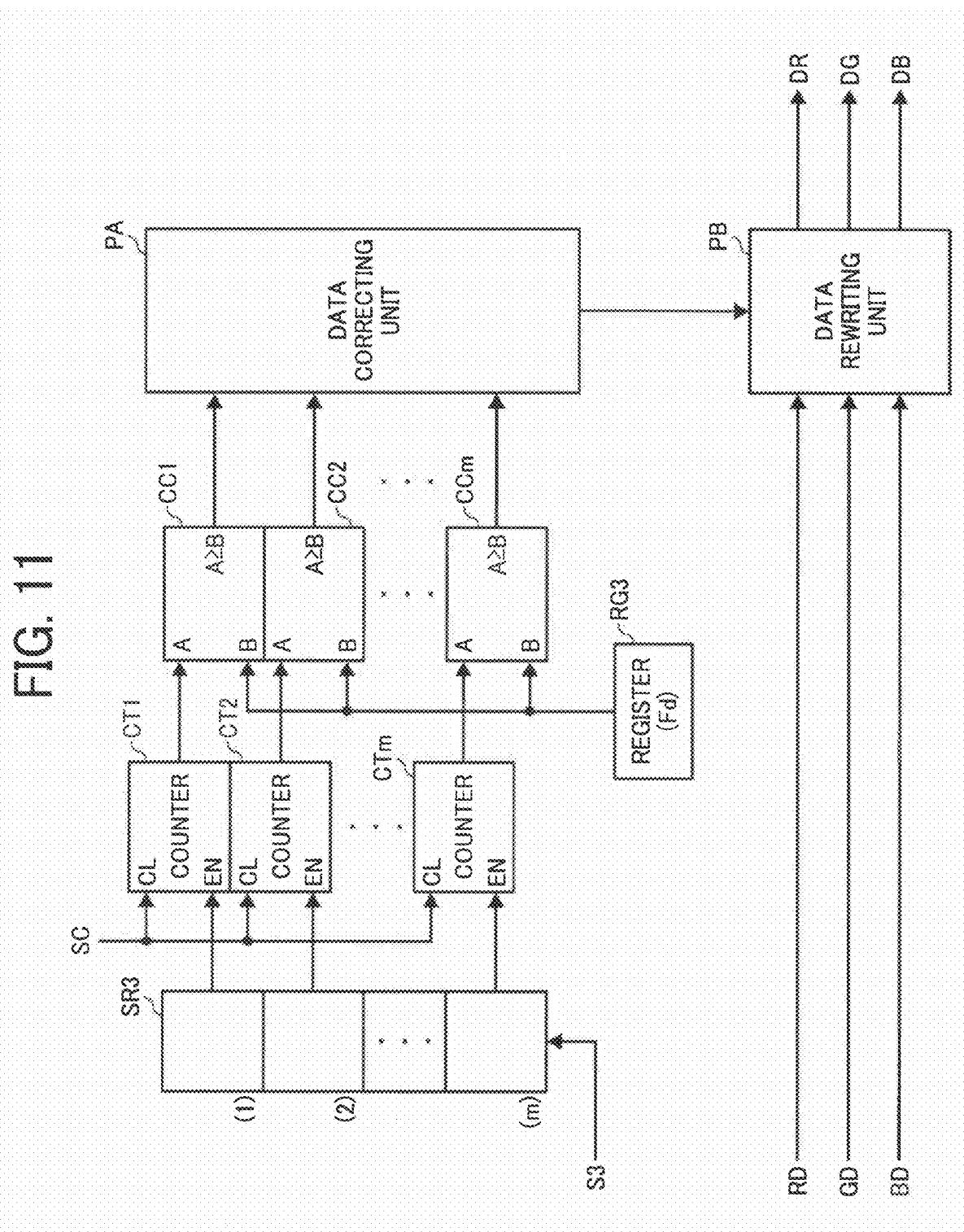

FIGS. 10 and 11 are block diagrams of an example of a structure of hardware to realize dust removal shown in a flowchart of FIG. 9.

In this case, the red read data RD output from the analog signal processor 25 shown in FIG. 4 is input to an input terminal A of a comparator CA1, and to one input terminal (input terminal for subtracted value) of a subtractor GA1 and the other input terminal (input terminal for subtracted value) of a subtractor GA3.

In this case, the green read data GD output from the analog signal processor 26 shown in FIG. 4 is input to an input terminal A of a comparator CA2, and to one input terminal (input terminal for subtracted value) of a subtractor GA2 and the other input terminal (input terminal for subtracted value) of the subtractor GA1.

In this case, the blue read data RD output from the analog signal processor 27 shown in FIG. 4 is input to an input terminal A of a comparator CA3, and to one input terminal (input terminal for subtracted value) of the subtractor GA3 and the other input terminal (input terminal for subtracted value) of the subtractor GA2.

To input terminals B of the comparators CA1, CA2, and CA3 is input the constant Xd (threshold for determining the black level) retained in the register RG1. The comparators CA1, CA2, and CA3 set the output to logic H level when the input of the input terminal A is smaller than the input of the input terminal B, and otherwise the output is set to logic L level and the output of the comparators CA1, CA2, and CA3 are input to an input terminal of a three-input AND circuit AN.

The AND circuit AN sets its output to the logic H level when all of the three input terminals are at the logic H level, and otherwise the output is set to the logic L level.

Therefore, with regarding to any pixels in which all of the red read data RD, the green read data GD, and the blue read data BD are smaller than the constant Xd, which are to be determined as a black pixel, an output signal S1 of the AND circuit AN is set to the logic H level.

The output signal S1 of the AND circuit AN is input to a shift register SR1. The shift register SR1 stores therein an output signal S1 of a target pixel X that is a subject of the dust determination and of Sd pixels adjacent to the target pixel (Sd is the threshold of the number of colored pixels in the main-scanning direction).

In other words, the shift register SR1 stores therein "1(=logic H level)" for the pixels determined to be a black pixel and "0(=logic L level)" for the other pixels, in the range of Sd pixels close to the target pixel X.

The subtractor GA1 calculates the formula: RD−GD, and the output is input to an input terminal A of a comparator CB1. The subtractor GA2 calculates the formula: GD−BD, and the output is input to an input terminal A of a comparator CB2. The subtractor GA3 calculates the formula: BD−RD, and the output is input to an input terminal A of a comparator CB3.

To the input terminals B of the comparators CB1, CB2, and CB3 are input the constant Dd (threshold of the differences of R, G, and B data) retained by a register RG2. The comparators CA1, CA2, and CA3 set the outputs to the logic H level when the input value to the input terminal A is larger than that to the input terminal B, and otherwise set the outputs to the logic L level. The outputs of the comparators CB1, CB2, and CB3 are input to the input terminal of a three-input OR circuit RR.

The OR circuit RR sets an output signal S2 to the logic H level when the signal input to any input terminal reaches the logic H level and sets the output signal S2 to the logic L level when the signal input to all the input terminals reaches the logic L level.

Accordingly, for a pixel satisfying any of these relations: (RD−GD)>Dd; (DG−DB)>Dd; and (DB−DR)>Dd, the output signal S2 of the OR circuit RR turns the logic H level.

The output signal S2 of the OR circuit RR is input to a shift register SR2 with the same number of transfer stages as the shift register SR1.

Therefore, the shift register SR2 stores therein "1 (=logic H level)" for a pixel satisfying any one of these relations: (RD−GD)>Dd; (DG−DB)>Dd; and (DB−DR)>Dd, and "0 (=logic L level)" for the other pixels, in the range of Sd pixels adjacent to the target pixel X.

The storage value of the shift register SR1, and the storage value of the shift register SR2 are input to a data comparing unit MM. The data comparing unit MM checks each pixel position whether containing a pixel in which the storage value of the shift register SR1 is 1 and the storage value of the shift register SR2 is 1. When one or more pixels satisfy the relation, the MM sets the output signal S3 to 1, and otherwise to 0. The output signal S3 of the data comparing unit MM is input to the shift register SR3 having the transfer stages whose number is the same as the number of pixels in the main scanning.

Accordingly, the output signal S3 of the data comparing unit MM corresponds to the result of determination 104 in FIG. 3. more specifically, the result "YES" of determination 104 corresponds to the value "1" of the signal S3, and the result "NO" of determination 104 corresponds to the value "0" of the signal S3.

Therefore, the shift register SR3 retains every result of determination 104 for each pixel position of a single line. The retained value of each pixel position of the shift register SR3 is input to an input terminal EN of counters CT1 to CTm.

The counters CT1 to CTm count up when the value of the input terminal EN is logic H level (="1") at the start-up timing of a clock SC (output every line cycle) output after the data comparing unit MM completes processing of one line, and clear the counted value when the value of the input terminal EN is logic L level (="0") at the start-up timing of the clock SC.

Therefore, the counters CT1 to CTm retain the number of continuous pixels for the pixel positions with the "YES" result of determination 104.

The counted values of the counters Ct1 to CTm are input to internal terminals A of comparators CC1 to CCm. The constant Fd (threshold of the line number of pixels colored in the sub-scanning direction) retained in the register RG3 is input to input terminals B of the comparators CC1 to CCm. The comparators CC1 to CCm set the outputs to the logic H level when the input value of the input terminal A is larger than the input value of the input terminal B, and otherwise set the outputs to the logic L level. The outputs of the comparators CC1 to CCm are input to a data correcting unit PA.

Accordingly, the outputs of the comparators CC1 to CCm correspond to the result of determination 105 shown in FIG. 9. More specifically, the result "YES" of determination 105 corresponds to the output value "1" from the comparators CC1 to CCm, and the result "NO" at determination 109 corresponds to the output value "0" from the comparators CC1 to CCm.

On the other hand, the red read data RD, the green read data GD, and the blue read data BD are input to a data rewriting unit PB having a plurality of line buffers. The data correcting unit PA controls the data rewriting unit PB to rewrite the value of the pixel position with "1" output from the comparators CC1 to CCm into a value corresponding to a white pixel in the range of peripheral Sd pixels (corresponding to processing 106).

Accordingly, the red read data DR, the green read data DG, and the blue read data DB output from the data rewriting unit PB become image read data with no influence of dust, and are output to a device of the next stage.

In the embodiment, dust is detected by a color change in the main-scanning direction of the color CCD line image sensor 20 having read the dust. However, the dust detection method may be different.

Figure 12:
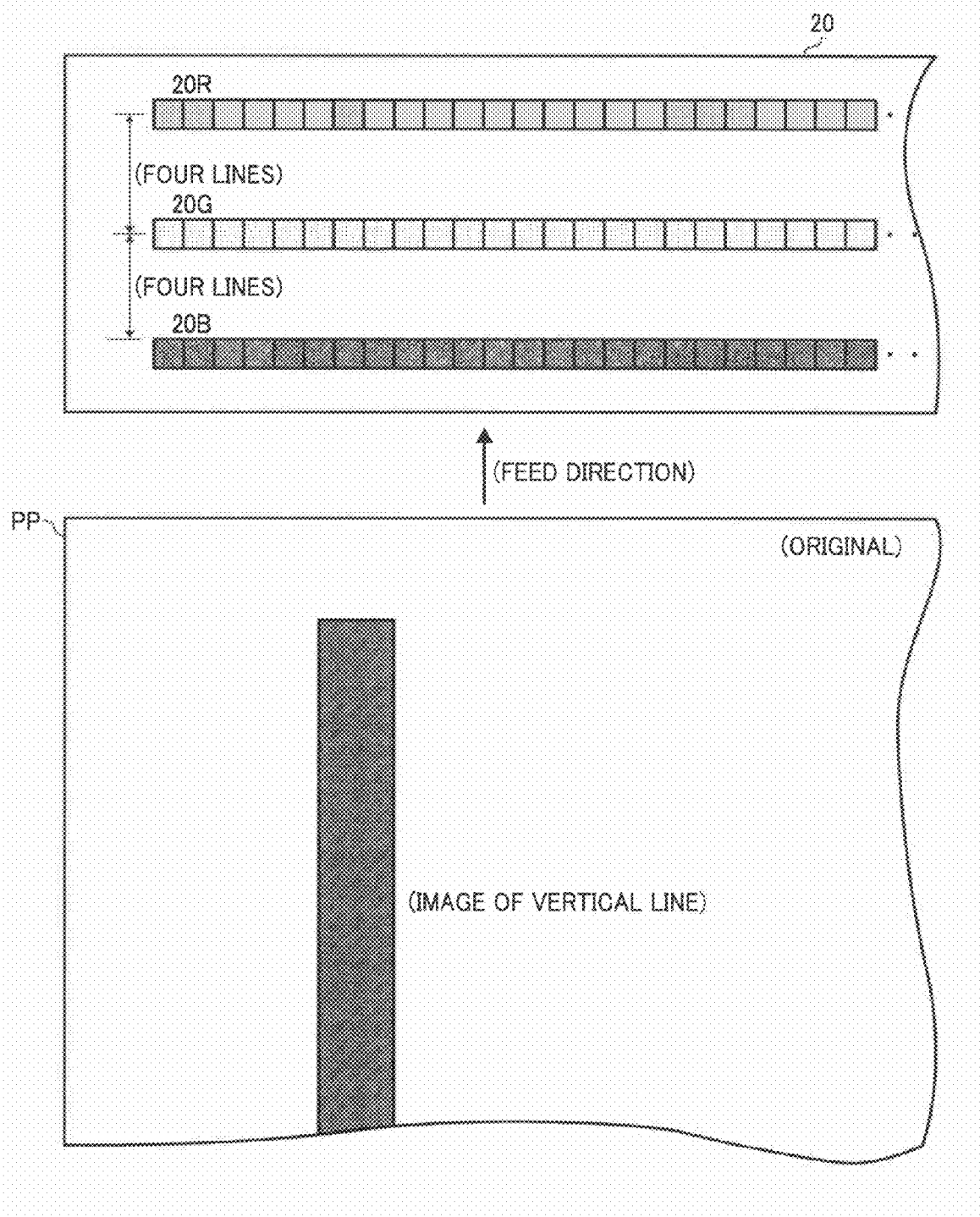
FIG. 12 is a schematic diagram for explaining reading of an image of a black vertical line on an original by the CCD line image sensor.

For example, as shown in FIG. 12, when reading a black vertical line image on an original with the color CCD line image sensor 20, the front end portion of the line is read only by the blue CCD line image sensor 20B first (the read color is cyan), is read by the blue CCD line image sensor 20B and the green CCD line image sensor 20G at four lines ahead, (the read color is blue), and is read by the blue CCD line image sensor 20B, the green CCD line image sensor 20G, and the red CCD line image sensor 20R at another four lines ahead (the read color is black).

The rear end of the image of the black vertical line is read by the green CCD line image sensor 20G and the red CCD line image sensor 20R after passing through the blue CCD line image sensor 20B (the read color is red), and is read only by the red CCD line image sensor 20R after passing through the green CCD line image sensor 20G at four lines ahead (the read color is yellow).

Figure 13:
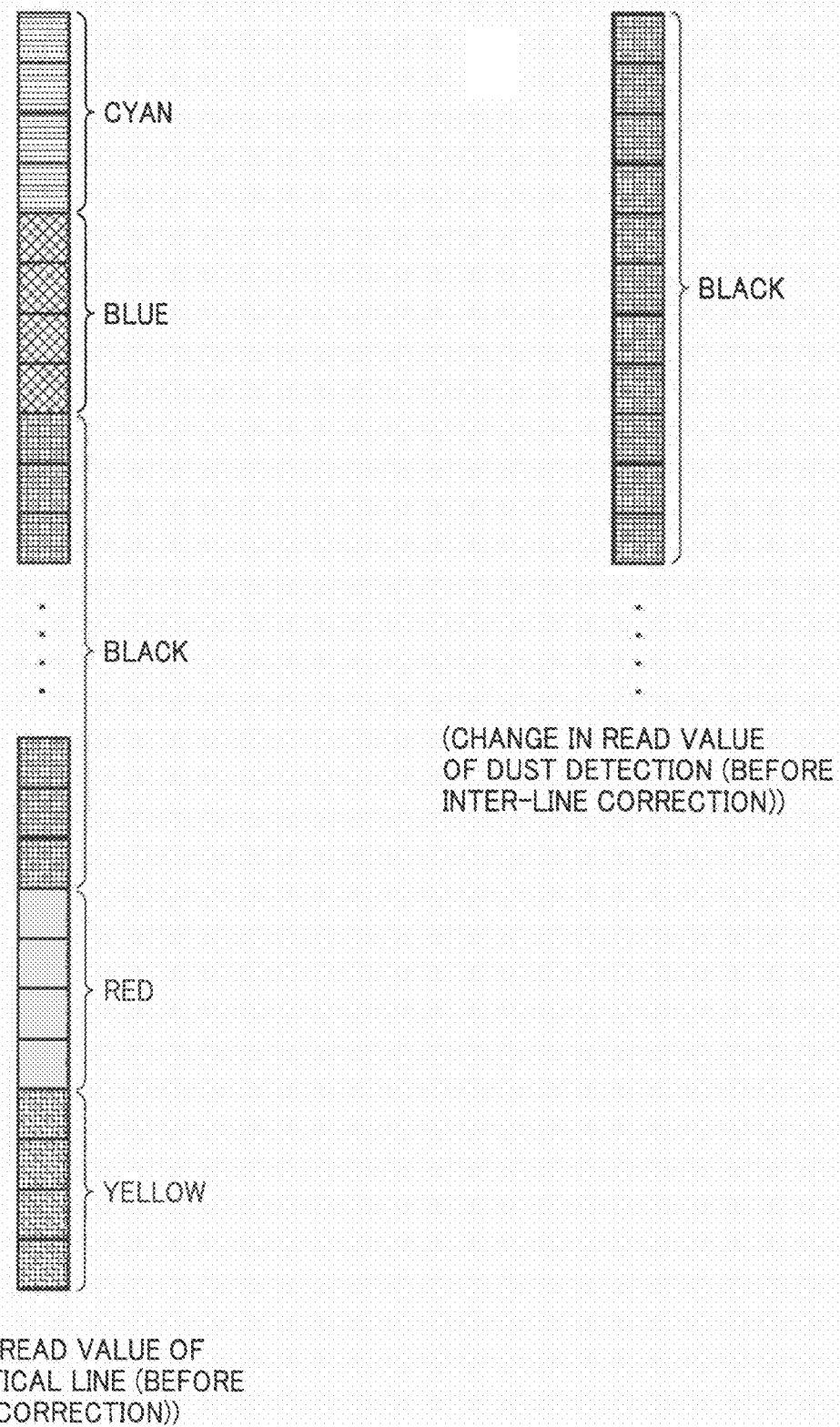
FIG. 13 is a schematic diagram for illustrating a comparison between a color change at the time of reading a black vertical line (before inter-line correction) and reading mode at the time of dust detection.

Accordingly, the image of the black vertical line shows a color change as shown in FIG. 13A in terms of the read color before the inter-line correction of the color CCD line image sensor 20.

However, if dust is attached, the dust is detected simultaneously by the red CCD line image sensor 20R, the green CCD line image sensor 20G, and the blue CCD line image sensor 20B as shown in FIGS. 5 to 7. Accordingly, before the inter-line correction, the read color is black from the beginning to the end as shown in FIG. 13B.

Figure 14:
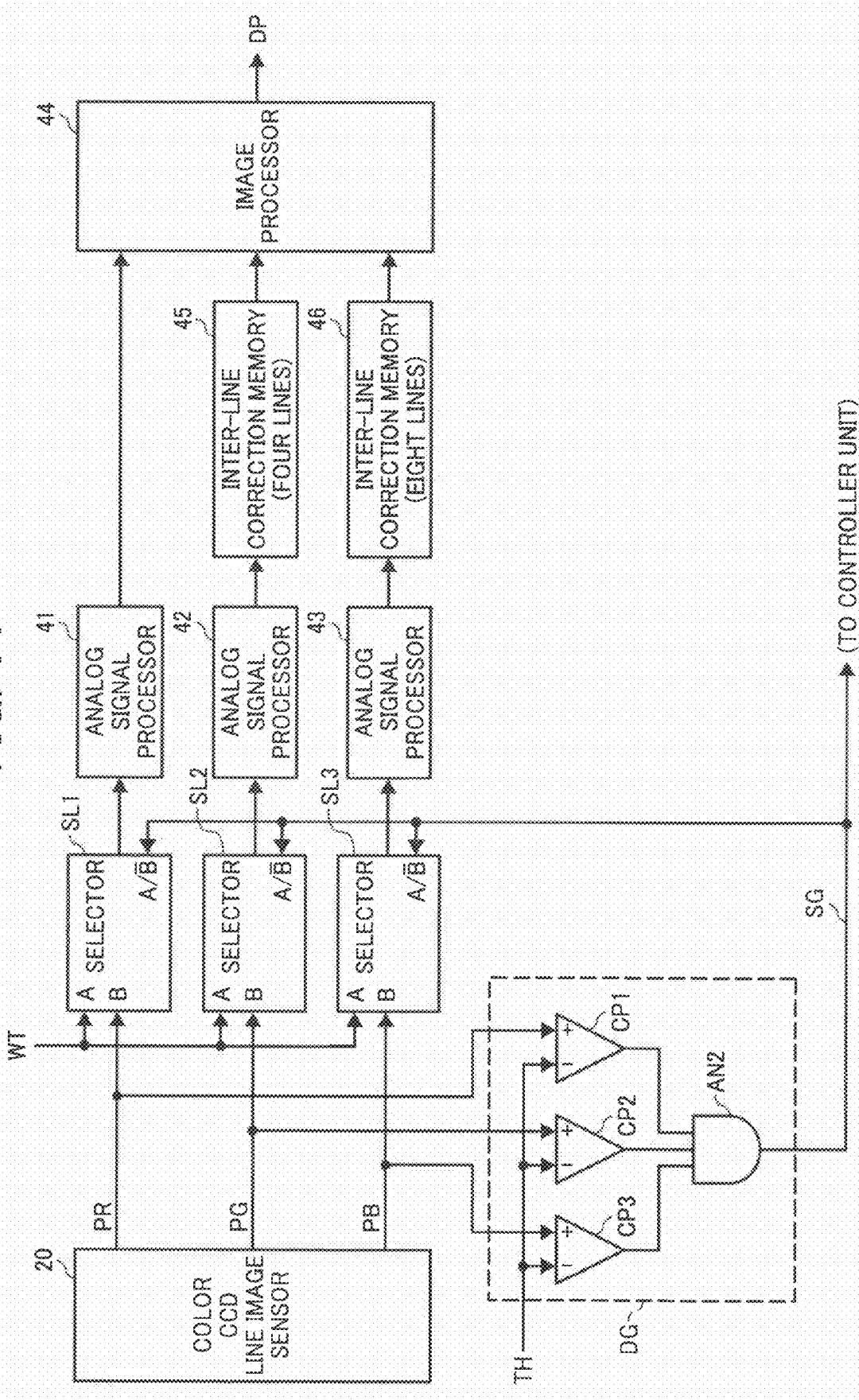
FIG. 14 is a block diagram of an example of dust detection and correction of reading signals.

Therefore, as shown in FIG. 14, the red reading signal PR, the green reading signal PG, and the blue reading signal PB output from the color CCD line image sensor 20 before the inter-line correction are compared with a threshold TH output from a signal generator (not shown) by comparators CP1, CP2, and CP3. The outputs from the comparators CP1, CP2, and CP3 are input to a three-input AND circuit AN2. When the outputs of the CP1, CP2, and CP3 are all at the logic H level, an output signal SG of the AND circuit AN2 rises up to the logic H level.

The signal SG is input to selection control signal terminals of selectors SL1, SL2, and SL3 and output to the controller unit UN1. To one input terminals A of the selectors SL1, SL2, and SL3 are input the white value WT output from a signal generator (not shown), and to the other input terminals are input the red reading signal PR, the green reading signal PG, and the blue reading signal PB.

The selectors SL1, SL2, and SL3 output the red reading signal PR, the green reading signal PG, and the blue reading signal PB, respectively, input to the input terminals B when the signal SG is at the logic L level, and output the white value WT input to the input terminals A when the signal SG is at the logic H level, in other words, the dust detection is working.

The output signals from the selectors SL1, SL2, and SL3 are input to the analog signal processors (AFE (analog front end)) 41, 42, and 43 as the corrected red reading signal PR, green reading signal PG, and blue reading signal PB, respectively.

The analog signal processors 41, 42, and 43 applies a predetermined image signal processing and analog-digital conversion to the red reading signal PR, the green reading signal PG, and the blue reading signal PB, respectively. The output signal from the analog signal processor 41 is input to an image processor 44, and the output signals from the analog signal processors 42 and 43 are input to the image processor 44 via inter-line correction memories 45 and 46.

The threshold TH is not always set for determining black value, but may be a smaller value suited for detecting dust. After conducting experiments, the suitable value should be determined according to what type of dust to be detected.

Figure 15:
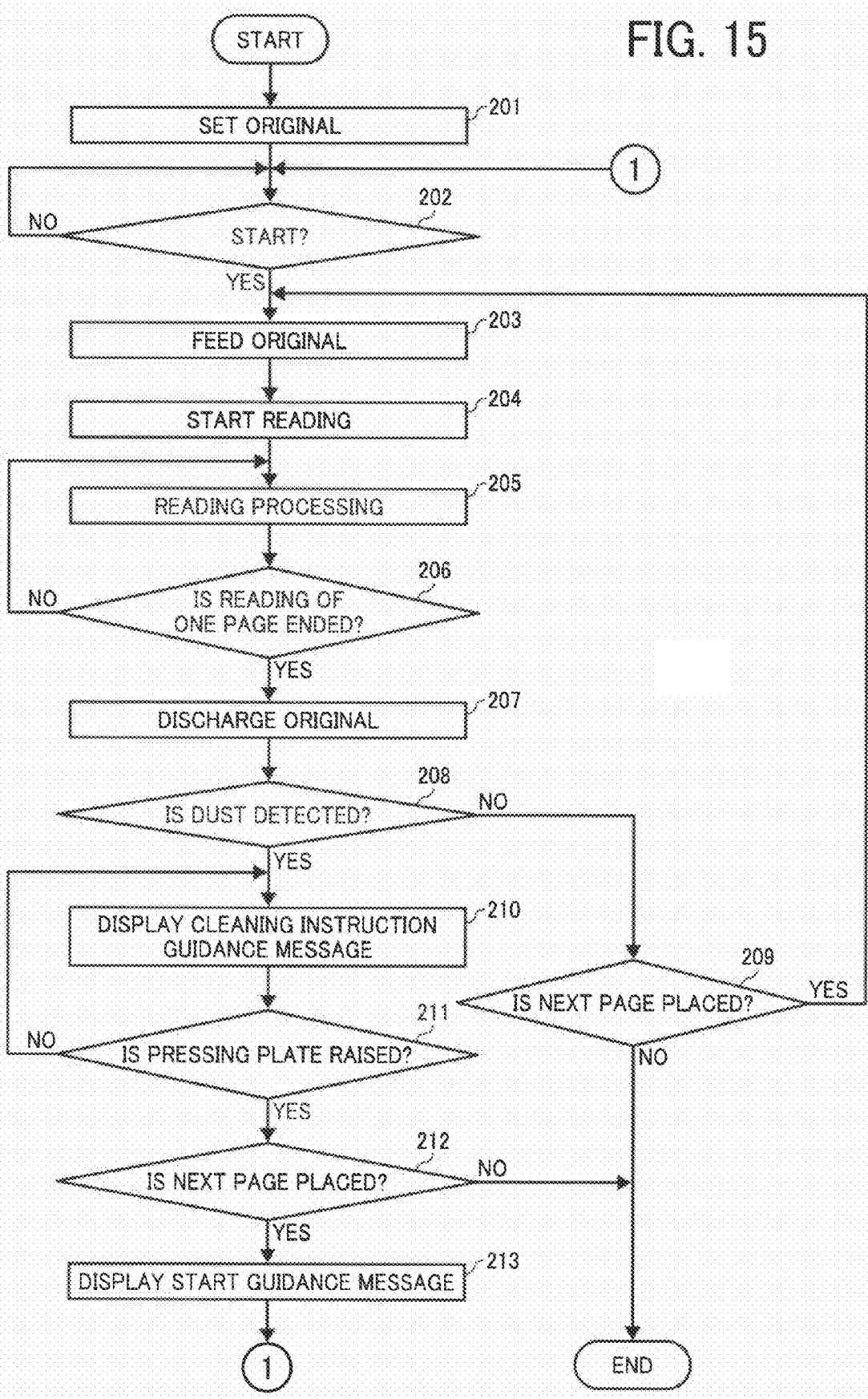
FIG. 15 is a flowchart of an example of processing by a controller unit when performing original reading.

FIG. 15 is a flowchart of an example of processing by the controller unit UN1 when performing original reading.

After the following operations by a user: placing an original on the automatic feeding unit 1a (processing 201); pressing a start key (not shown) of the operation displaying unit UN2; and ordering a start of reading operation (result of determination 202 is "YES"), the original is fed (processing 203), and the reading operation is started (processing 204).

Then, operation for reading one page is performed (processing 205, NO loop of determination 206). After completing the operation for reading one page ("YES" in the result of determination 206), the original is discharged (processing 207).

While the operation for reading one page is performed, it is checked whether the signal SG has become the logic H level, and it is confirmed whether dust has been detected (determination 208). When no dust is detected and the result of determination 208 is NO, it is checked whether the next page is placed on the automatic feeding unit 1a (determination 209). When the result of determination 209 is YES, the procedure returns to processing 203, the next original is fed, and the original image is read.

When the operation for reading all the originals is completed and the result of determination 209 is NO, the image reading operation is terminated.

On the other hand, when dust is detected and the result of determination 208 is YES, a guidance message for encouraging a user to clean the contact glass 10 is displayed (processing 210, NO loop of determination 211). When the user opens the pressing plate (automatic feeding unit 1a), cleans the contact glass 10, and close the pressing plate in response to the guidance message, it is checked whether a next page is placed on the automatic feeding unit 1a (determination 212). When the result of determination 212 is YES, a guidance message for encouraging the user to press the start key is displayed (processing 213). The procedure returns to determination 202, and proceeds to the operation of reading the next original image.

When the result of determination 212 is NO after the operation of reading all the originals, the image reading operation is terminated.

In this way, in the present embodiment, if dust is detected while reading an image of an original, a user is encouraged to clean the contact glass 10 after the termination of the image reading of the original; therefore, the influence of dust can be minimized.

Although the color CCD line image sensor 20 having three read lines is used in the embodiment, the present invention can be applied to the CCD line image sensor having two read lines, or four or more lines.

Although the present invention is applied to an image reading device in the embodiment, the present invention may be applied to an image processing apparatus or image forming apparatus having color original reading function.

As described above, according to an aspect of the present invention, an appropriate dust detection can be performed with a smaller memory capacity than a conventional method in which dust is not detected until a straight line image is detected in a direction parallel to a sub-scanning direction, because in the method according to an embodiment of the present invention the dust determination is performed with reference to read value of image data of a plurality of lines obtained by one scanning.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An original reading device that reads an original by feeding it in a sub-scanning direction on a contact glass, the original reading device comprising:
    a line image sensor that reads an image of a reading position on the contact glass by a plurality of lines in a main-scanning direction; and
    a replacing unit that replaces, when there is a first pixel whose read values of read data output from a plurality of read lines at a same main scanning period are smaller than a predetermined black threshold and an adjacent pixel whose two arbitrary read values have a difference larger than a predetermined threshold near the first pixel, and if the first pixel remains at a same pixel position for a predetermined number of continuous main scanning periods, replaces read data of the adjacent pixel and a predetermined number of pixels following the adjacent pixel with white pixel data.

2. The original reading device according to claim 1, wherein the line image sensor has a function of separating three primary colors and three read lines.

3. The original reading device according to claim 2, wherein the predetermined black threshold, the predetermined threshold, and the predetermined number are different in a monochrome reading mode and a color reading mode.

4. The original reading device according to claim 1, wherein a predetermined number of continuous main scanning lines is based on a reading magnification.

5. An image forming apparatus comprising an original reading device according to claim 1.

6. An original reading device that reads an original by feeding it in a sub-scanning direction on a contact glass, the original reading device comprising:
    a line image sensor that reads an image of a reading position on the contact glass by a plurality of lines in a main-scanning direction; and
    a replacing unit that replaces, when there is a first pixel whose read values of read data output from a plurality of read lines at a same main scanning period are all smaller than a predetermined black threshold and an adjacent pixel whose two arbitrary read values have a difference larger than a predetermined threshold near the first pixel, if the first pixel remains at a same pixel position for a predetermined number of a continuous main scanning periods, and if the first pixel is detected a plurality of times in a plurality of read lines, replaces read data of a pixel sandwiched by the first pixels and located in a region including the adjacent pixel with white pixel data.

7. The original reading device according to claim 6, wherein the line image sensor has a function of separating three primary colors and three read lines.

8. The original reading device according to claim 7, wherein the predetermined black threshold, the predetermined threshold, and the predetermined number are different in a monochrome reading mode and a color reading mode.

9. The original reading device according to claim 6, wherein a predetermined number of continuous main scanning lines is based on a reading magnification.

10. An image forming apparatus comprising an original reading device according to claim 6.

* * * * *